Dec. 10, 1957 R. L. CRANE 2,815,561
AUTOMATIC FEED CONTROL APPARATUS FOR MACHINE TOOLS
Original Filed Jan. 31, 1955 2 Sheets-Sheet 1

Inventor
Robert L. Crane
By Ira Milton Jones
Attorney

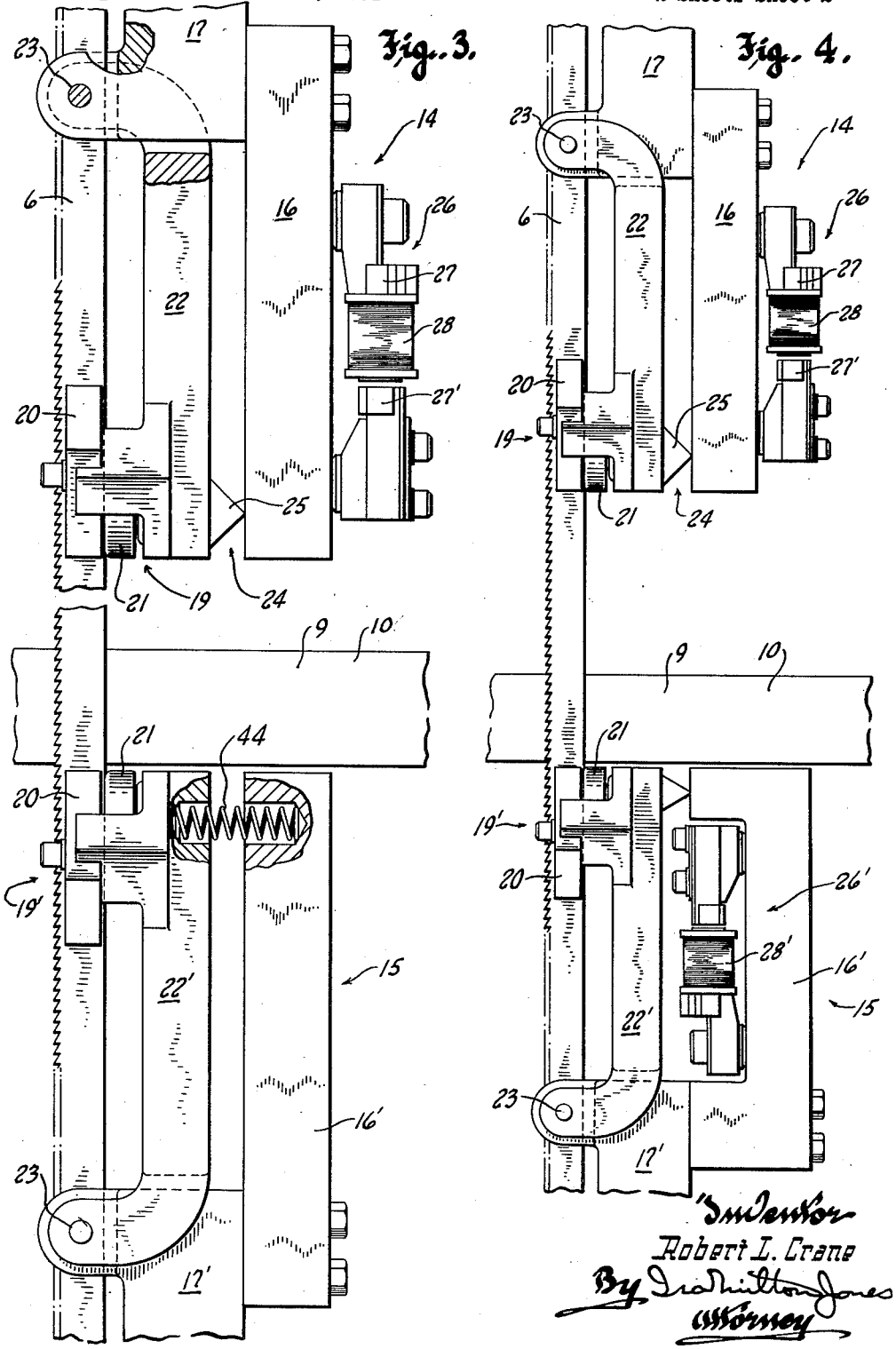

United States Patent Office 2,815,561
Patented Dec. 10, 1957

2,815,561

AUTOMATIC FEED CONTROL APPARATUS FOR MACHINE TOOLS

Robert L. Crane, Hopkins, Minn., assignor to Continental Machines, Inc., Savage, Minn., a corporation of Minnesota Original application January 31, 1955, Serial No. 484,904, now Patent No. 2,774,131, dated December 18, 1956. Divided and this application November 14, 1955, Serial No. 546,504

4 Claims. (Cl. 29—68)

This invention relates to machine tools and refers more particularly to metal cutting band saws wherein work mounted upon a supporting table is fed against a saw band constrained to downward travel through an opening in the table.

As is customary in machine tools of this type, and especially the larger capacity tools, power means are generally provided to advance the work supporting table and thereby feed the work to the saw band. One such power driven work feeding means is illustrated in Patent No. 2,625,965, issued January 20, 1953, to Continental Machines, Inc. Manual control of the power driven work feed is generally provided, but even skilled operators have found it difficult in the past to maintain the most efficient and effective rate of work feed. Obviously, the rate of feed must not be excessive for this places an undue load upon the saw band often resulting in breakage of the band and untimely wearing of its cutting edge; and less than the correct rate of work feed fails to take full advantage of the capacity of the machine.

The copending application of Robert L. Crane, Serial No. 371,302, filed July 30, 1953, now Patent No. 2,754,567 discloses and covers an automatic control for the power driven work feeding means of such band saws, which control is governed by the work feeding pressure upon the saw band; more specifically by the response of a strain sensitive element to deflection of a backup post upon which the element is mounted and which post carries the thrust of the work feeding pressure on the saw band. The present invention is an improvement upon that control, and accordingly this application bears a continuation-in-part relationship to said pending application.

The improvement here presented is also disclosed but not claimed in another pending application of Robert L. Crane, Serial No. 484,904 filed January 31, 1955 (now Patent No. 2,774,131), so that the instant application bears a divisional relationship to that pending application.

Generally speaking the automatic control of the work feed disclosed in the aforesaid pending application Serial No. 371,302 (Patent No. 2,754,567), and upon which the present invention is an improvement, consists in the provision of a control circuit operable to regulate the speed of the prime mover or power means used to effect the work feed, a strain sensitive element mounted upon a deflectable backup which carries the thrust of the work against the saw band, and suitable instrumentalities connecting the strain sensitive element with the control circuit so that the rate of work feed is governed by deflection of the backup, which in turn, is a measure of the thrust of the work against the saw band. However, in the control system of the aforesaid pending application Serial No. 371,302 (Patent No. 2,754,567), the means by which the thrust on the saw band was imparted to the deflectable backup post was fixed to the post and included the saw guide by which the saw band is guided as it enters the work zone above the work supporting table. Consequently, the deflection of the backup post resulted not only from the thrust of the work against the post, but in part also from the drag of the saw band upon the saw guide since the mounting for the backup post is of necessity so located that this drag created a turning moment upon the backup post.

With a view toward achieving greater accuracy in the control of the machine, this invention has as its main purpose to provide means whereby any forces resulting from drag of the saw band upon the saw guide will be contained and prevented from being imposed upon the deflectable backup.

More specifically an object of the present invention is to mount the saw guide independently of the backup in a way which firmly restrains the saw guide against movement endwise and torsionally of the saw band while permitting the saw guide to move freely in the direction the work feeding thrust is imposed upon the saw band, and further to provide a thrust transmitting connection between the thus mounted saw guide and the deflectable backup which is incapable of transmitting to the backup any forces other than the work feeding pressure on the saw band.

The aforesaid pending application Serial No. 484,904, filed January 31, 1955 (Patent No. 2,774,131), discloses but does not claim this manner of mounting the saw guide and transmitting the thrust to the deflectable backup.

It has also been found that greater accuracy in the control of the work feed rate will be attained if the lower saw guide with which band saws are generally equipped and which is located beneath the work supporting table, is yieldable in the direction of the thrust applied to the saw band by the work; and accordingly, this invention has as another of its objects to so mount the lower saw guide.

As explained in application Serial No. 371,302 (Patent No. 2,754,567), two strain gages of the electromagnetic type sold by the General Electric Co., or the resistance type disclosed in Patent No. 2,292,549, may be mounted back-to-back upon a single deflectable backup in such a way that deflection of the backup causes the impedance or resistance of one of the gages to increase and the impedance or resistance of the other to decrease, or if desired, a single strain gage mounted upon the deflectable backup may be balanced against a suitable reference unit. The former expedient has the advantage of affording a control current of greater magnitude for a given deflection of the backup and with a view toward utilizing this advantage, the present invention has as another of its objects to provide duplicate backup posts and strain sensitive elements above and below the work table and so arranged that their effect produced by deflection of the backups is cumulative.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 3 is a view at an enlarged scale illustrating the companion upper and lower saw guides and backups of the band saw to better illustrate the invention, and Figure 4 is a view similar to Figure 3, but illustrating the adaptation of strain sensitive elements or gages mounted on the upper and lower deflectable backups.

Figure 1:
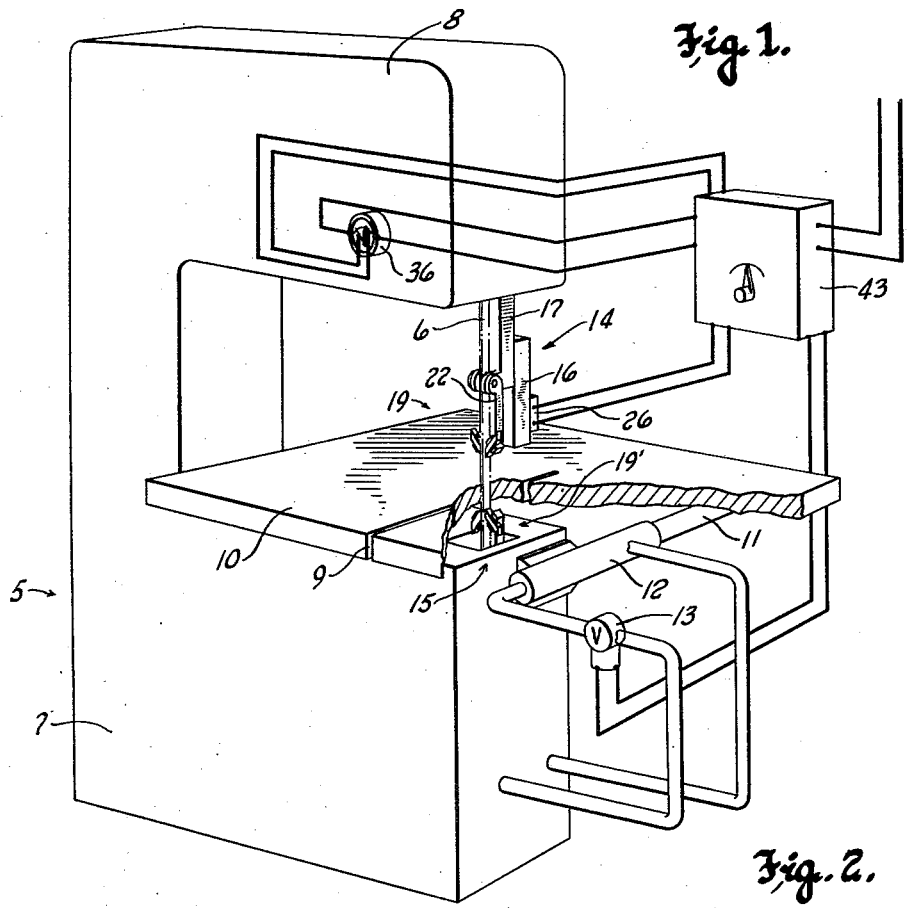
Figure 1 is a diagrammatic perspective view illustrating generally the application of this invention to a metal cutting band saw equipped with a hydraulically-powered work table feeding mechanism.

Referring now particularly to the accompanying drawings in which like numerals indicate like parts throughout several views, the numeral 5 designates the frame of a metal cutting band saw of the type wherein an endless flexible saw band 6 is trained over pulleys (not shown) mounted in the base 7 and head 8 of the frame, to have one stretch of the band travel downwardly in a straight line through a slot 9 in a work supporting table 10. The area above the table 10 and within the throat defined by the frame of the machine thus constitutes the work zone of the machine.

The table 10 is mounted for rectilinear motion in a direction parallel with its slot 9 to feed work mounted on the table against the front cutting edge of the saw band which, of course, has suitable cutting teeth while the opposite rear edge is smooth and provides a bearing surface. The advance of the table may be effected hydraulically as diagrammatically illustrated in Figure 1, and as more fully illustrated in Patent No. 2,625,965. In this event, a ram 11 of a hydraulic cylinder 12 is connected to the table while the cylinder 12 is secured to the base of the main frame. The table, therefore, partakes of in and out movement of the ram produced by hydraulic pressure in one end or the other of the cylinder 12.

The hydraulic feed line leading to that end of the cylinder 12 to which fluid must be fed to effect work feeding movement of the table, has a solenoid responsive control valve 13 connected therein to provide means for varying work feed rate.

The saw band is supported against the thrust of the work thereon by an upper deflectable backup 14 located above the work table and hence above the work zone, and a lower deflectable backup 15 located below the work table. These deflectable backups have stiff posts 16—16', the upper post 16 being rigidly mounted in the head 8 of the machine for vertical adjustment to enable its lower end to be brought down close to the work on the table. The specific structure by which the upper post 16 is thus vertically adjustably mounted, forms no part of this invention and therefore has not been shown. However, as indicated in the drawings, the mounting means includes a vertically adjustable supporting member 17 to which the post is solidly fixed. The post 16' of the lower backup need not be vertically adjusted, hence it is simply fixed to a stationary supporting member 17' suitably mounted in the base 7 of the machine.

The manner in which the thrust imposed upon the saw band by the work is transmitted to the backup posts 16 and 16', constitutes an important feature of this invention. Thus, in accordance with the invention, the customary saw guides indicated generally by the numerals 19 and 19', instead of being fixed to the free ends of the backup posts as has been the practice heretofore, are separately mounted for free movement thereof in the direction of the work feeding thrust upon the saw band and merely bear upon or against the backup posts. The saw guides are substantially as disclosed in Patent No. 2,311,426, and hence have a pair of angularly disposed guide bars 20 which engage the opposite faces of the saw band, and a roller 21 mounted with its axis to one side of the path of the saw band and its front face in position to have the back edge of the band ride thereon. Accordingly, when properly mounted, the saw guides serve to hold the saw band against movement with respect thereto, except its intended linear downward travel, and of course edgewise forward removal to permit replacement of the band.

To mount the saw guides in the manner contemplated, each is fixed to the free end of an arm 22—22' which extends lengthwise along the back edge of the saw band toward the adjacent post support 17—17', and each arm 22—22' has a hinged connection 23 with its respective post support. Attention is directed to the fact that the hinged ends of these arms and the adjacent portions of the supports to which they are hinged, are bifurcated to accommodate the saw band and allow the axes of the hinge connections 23 to pass through the path of the saw band perpendicularly to the sides of the band. Accordingly, the points of support for the saw guides lie close to the path of the cutting edge of the saw band so that little or no turning moment is imparted to the saw guides by the drag of the saw band thereon, and any of the forces which result from such drag are substantially fully contained within the supporting structure of the saw guides. Thus the mounting of the saw guides restrains them against movement endwise and torsionally with respect to the saw band but leaves them free to swing rearwardly in response to thrust imposed upon the saw band by the work.

The thrust imposed upon the saw guides in the embodiment of the invention particularly illustrated in Figure 3 is transmitted to the upper backup 16 through a connection 24 which consists simply of a conical boss 25 projecting from the rear of the arm 22 with its apex bearing against the front face of the backup post at its lower end. Any equivalent manner of imparting thrust from the arm 22 to the post 16 may be employed as long as the resulting connection is capable of applying the force which results from the thrust of the work against the saw band, onto the post in a direction substantially transverse to the path of the saw band while accommodating the needed relative movement between the saw guide and the post.

The thrust thus imparted to the backup post results in deflection of the post, and this deflection is utilized through the medium of a strain sensitive element 26 mounted upon the post to control the work feeding pressure. As more fully brought out in the copending application Serial No. 371,302, filed July 30, 1953 (Patent No. 2,754,567), the specific type of strain sensitive element or gage employed is not important, and for purposes of illustration, the electromagnetic type sold by General Electric has been shown on the drawings.

Figure 2:
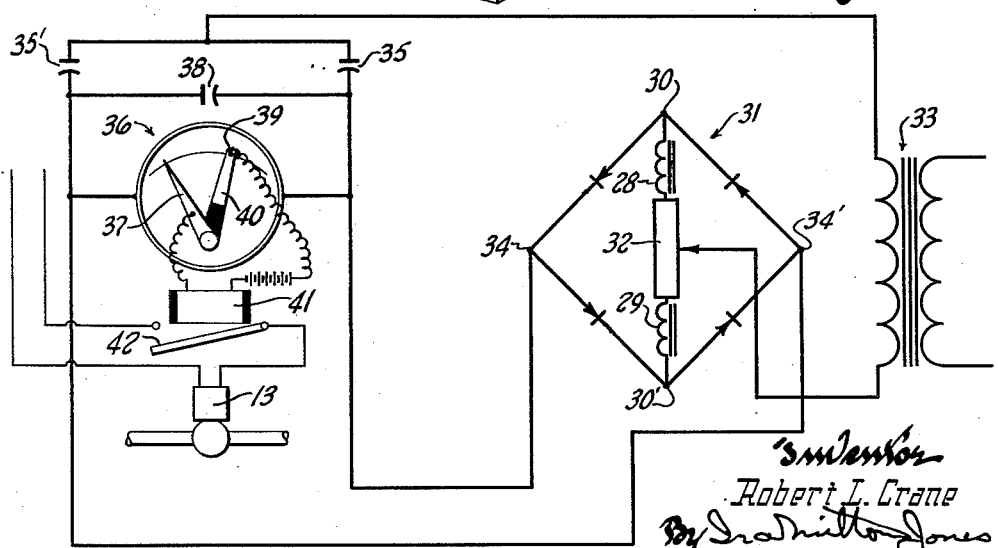
Figure 2 is a circuit diagram of the control for the power feeding mechanism.

The illustrated strain gage comprises two magnetic poles 27 and 27' both rigidly bolted to the backup post with an air gap therebetween. One of the poles has a coil 28 mounted thereon, and as the air gap between the poles changes as by lateral relative movement of the poles, the coil impedance changes. This changing impedance of the coil is used to effect a change in a control circuit, one embodiment of which is diagrammatically illustrated in Figure 2. As here shown, the coil 28 of the strain gage and a reference coil 29 are connected across opposite corners 30—30' of a rectifier bridge circuit 31, in series with the resistance element of a potentiometer 32. The slider of the potentiometer is connected to one side of an A. C. power source provided by the secondary coil of a transformer 33. The other two corners 34—34' of the bridge are respectively connected through capacitors 35—35' with the opposite side of the transformer secondary. Preferably the transformer is of the voltage regulator type so as to minimize the effects of varying line voltage.

A suitable current responsive instrument 36 is connected across the corners 34—34' of the bridge to show by the position of its pointer 37 any deviation from a predetermined relationship between the impedance of the coils 28 and 29. The potentiometer 32 enables the bridge to be so balanced that when the strain or thrust on the backup support is zero, the pointer 37 is at zero indicating that the current flow during each half cycle through one of the capacitors 35—35', one leg of the rectifier and one of the coils 28—29 is the same as that flowing through the other capacitor, the other leg of the rectifier, and the other coil.

As the backup post upon which the strain gage is mounted is deflected by the thrust of the work feed against the toothed edge of the saw band, the impedance of the coil 28 changes, and consequently there will be a different current flow through each of the capacitors 35—35' and a different voltage drop across each. The resulting voltage differential causes a current to flow through the instrument 36 to swing its pointer 37 clockwise across its dial. A capacitor 38 connected across the corners 34—34' of the bridge smooths out the ripple of the D. C. output current.

As the pointer 37 swings across the face of its dial it approaches a contact 39 on an adjustable arm 40, and when it engages this contact, an energizing circuit is completed for an electromagnet 41. Energization of this electromagnet closes a switch 42 and this in turn, closes the circuit for the solenoid valve 13 to effect closure of the valve and cessation of work feeding movement of the table 10. By virtue of the adjustability of the contact carrying arm 40, the control can be adjusted to maintain an optimum work feed rate, which of course, is just below that point at which the thrust upon the saw band exceeds the critical value.

For convenience, the instrument 36 is preferably mounted upon the head 8 of the machine, but the potentiometer 32 and the rectifiers of the bridge circuit are preferably mounted in a cabinet 43, which may be located wherever convenient.

In that form of the invention illustrated in Figure 3 where only the upper backup post carries a strain gage, the thrust applied to the lower saw guide 19' is cushioned and prevented from affecting the accuracy of the control by virtue of the fact that its arm 22' is yieldingly held in proper position by a spring 44 interposed between the backup post 16' and the arm 22'. The spring 44 is sufficiently light to preclude having the lower backup post take any appreciable amount of the work feed force. The advantage of this arrangement is that it eliminates the need for a second strain gage on the lower backup and still permits fairly sensitive feed control.

In the embodiment of the invention illustrated in Figure 4, the strain gage and all associated structure is duplicated below the work zone, and accordingly a second strain gage 26' is mounted upon the backup post 16', but in opposed relation to the strain gage 26 on the upper backup post. Accordingly, the changes in impedance resulting from deflection of the two posts are in opposite directions so that the net result is cumulative. With this arrangement, there is no need for a reference coil since the coils 28 and 28' of the two strain gages may be opposed to one another in the bridge circuit in the same manner as were the coils 28 and 29 in the circuit hereinbefore described.

It should be understood that where a second strain gage is used in the manner described, that is, mounted upon the lower backup post, suitable provision must be made for protecting it against metal chips coming in contact with the gage posts and thereby changing the magnetic constants of the circuit. The lower strain gage must also be protected from contact with the liquid coolant used in the operation of the machine, which in time would otherwise injure the insulation on the coil.

From the foregoing description taken in connection with the accompanying drawings, it will be readily apparent to those skilled in this art that this invention constitutes an important improvement upon the invention forming the subject matter of the pending application Serial No. 371,302 (Patent No. 2,754,567), and that it contributes greatly to the preciseness of the work which can be performed with a metal cutting band saw.

What is claimed as my invention is:

1. The combination with an elongated saw member lengthwise movable along a defined path, which saw member has cutting teeth along its front edge and a bearing surface along its back edge, a work holding member adapted to hold work to be acted upon by the saw member, said members being relatively movable to effect work performing feed engagement between the saw member and work held by the other member, a deflectable backup to support the saw member against the thrust of the work thereon, a prime mover having a speed adjusting means and means connecting the prime mover with one of said members to effect said relative movement between the saw member and the work holding member, of means to automatically govern the operation of the prime mover in accordance with the thrust of the work against the saw member comprising a power circuit including a strain sensitive element mounted upon the backup and operable by deflection of the backup resulting from work feeding pressure upon the saw member to effect a change in the power output of said circuit and means connecting the power output of said circuit to the adjusting means of said prime mover, characterized by the fact that the means whereby the work feeding pressure on the saw member is imparted to the deflectable backup comprises: a saw guide engaging the sides and back edge of the saw member; a thrust transmitting connection between the saw guide and the deflectable backup, said connection being arranged to apply force to the deflectable backup in a direction substantially transverse to the path of the band; and means mounting the saw guide for free movement thereof in the direction of said thrust upon the saw member but restraining the saw guide against movement lengthwise and torsionally of the saw member, so that the deflection of the backup and the consequent response of the strain sensitive element is a measure of the thrust of the work against the saw member unaffected by the drag of the saw member upon the saw guide, said means comprising a fixed support; a part fixed to the saw guide; and a hinge connecting said part with the fixed support, the axis of the hinge being perpendicular to the sides of the saw member and passing through the path thereof as it moves through the saw guide.

2. The combination of claim 1 further characterized by the fact that the deflectable backup comprises: a post parallel to the saw member and rigidly fixed at one end thereof to a solid support spaced a substantial distance from the saw guide, the thrust transmitting connection between the saw guide and the backup being at the opposite free end of said backup post; and further characterized by the fact that the mounting for the saw guide comprises an arm fixed to the saw guide and extending therefrom parallel to the saw member and the backup post to a point adjacent to the fixed end of the backup post, and means freely pivotally supporting said arm at said point for free swinging movement about an axis perpendicular to the sides of the saw member and passing through the path thereof as it moves through the saw guide.

3. The combination of claim 1 further characterized by the fact that the endwise moving saw member moves through a work zone; and by the fact that said deflectable backup, strain sensitive element, saw guide, thrust transmitting connection between the saw guide and backup, and the mounting for the saw guide are at one side of the work zone and are duplicated at the opposite side of the work zone, but with the two strain sensitive elements arranged to oppose one another in their effect, and with both said elements connected in said power circuit so that their net effect in said circuit is cumulative.

4. The combination of claim 1 further characterized by the fact that: the work holding member is a horizontal table through which the endwise moving saw member passes in a straight vertical path; by the fact that said deflectable backup, strain sensitive element, saw guide, thrust transmitting connection between the saw guide and backup and the mounting for the saw guide are located above said table; and further characterized by the provision of a second backup for the saw member located below said table; a second saw guide engaging the saw member below said table; thrust transmitting means positioned to receive thrust from said second saw guide; and spring means interposed between said thrust transmitting means and said second backup.

References Cited in the file of this patent

UNITED STATES PATENTS

| | | |
|---|---|---|
| 1,069,032 | Roick | July 29, 1913 |
| 2,286,589 | Tannewitz | June 16, 1942 |
| 2,296,967 | Wilkie | Sept. 29, 1942 |

FOREIGN PATENTS

| | | |
|---|---|---|
| 371,666 | Great Britain | Apr. 28, 1932 |